United States Patent [19]

Shawcross et al.

[11] Patent Number: 6,028,180

[45] Date of Patent: Feb. 22, 2000

[54] INK COMPOSITIONS

[75] Inventors: Andrew Paul Shawcross, Manchester; Gavin Wright, Bury; Barry Huston Meyrick, Manchester; Mark Holbrook, Bury, all of United Kingdom

[73] Assignee: Zeneca Limited, London, United Kingdom

[21] Appl. No.: 09/272,175

[22] Filed: Mar. 18, 1999

[30] Foreign Application Priority Data

Mar. 19, 1998 [GB] United Kingdom ............... 9805782

[51] Int. Cl.$^7$ .............................. C09B 33/24; C09D 11/00
[52] U.S. Cl. ..................... 534/685; 106/31.52; 523/161; 524/190; 347/100; 8/639
[58] Field of Search ................. 534/685; 106/31.52; 524/190; 523/161; 347/100

[56] References Cited

FOREIGN PATENT DOCUMENTS 2050539  4/1971  France .
1160771  8/1969  United Kingdom .

*Primary Examiner*—Fiona T. Powers
*Attorney, Agent, or Firm*—Rothwell, Figg, Ernst & Kurz, p.c.

[57] ABSTRACT

An ink comprising water, a water-dissipatable polymer and one or more dyes having a benzene ring carrying a hydroxy group at each of the 1-, 3- and 5-positions and an azo group at each of the 2-, 4- and 6-positions or a tautomer thereof.

Also claimed are certain dyes, compositions printer cartridges and ink jet printers.

13 Claims, No Drawings

INK COMPOSITIONS

This invention relates to inks, dyes, cartridges, ink jet printers and to their use in ink jet printing.

Ink jet printing methods involve a non-impact printing technique for printing an image onto a substrate using ink droplets ejected through a fine nozzle onto a substrate without bringing the nozzle into contact with the substrate.

There are many demanding performance requirements for dyes and inks used in ink jet printer. For example they desirably provide sharp, non-feathered images having good water-fastness and optical density. The inks are often required to dry quickly when applied to a substrate to prevent smudging, but they should not form a crust over the tip of an ink jet nozzle because this will stop the printer from working. The inks should also be stable to storage over time without decomposing or forming a precipitate which could block the fine nozzle. The most popular ink jet printers are the thermal and piezoelectric ink jet printers.

We have now found that very good ink jet printing inks may be prepared having the compositions defined below.

According to the present invention there is provided an ink comprising water, a water-dissipatable polymer and one or more dyes having a benzene ring carrying a hydroxy group at each of the 1-, 3- and 5-positions and an azo group at each of the 2-, 4- and 6-positions or a tautomer thereof.

The azo groups at the 2-, 4- and 6-positions are optionally the same as each other, two can be the same and one different, or all three azo groups can be different from each other. Preferably each azo group independently is of the formula —N=N—A wherein A is an optionally substituted heteroaryl or an optionally substituted aryl group.

Preferred heteroaryl groups are thiazolyl, isothiazolyl, benzothiazolyl, benzisothiazolyl, pyrazolyl, thiadiazolyl, triazolyl, imidazolyl, thienyl, pyridyl and pyridoisothiazolyl.

Preferred aryl groups are phenyl and naphthyl, especially phenyl.

The optional substituents which may be present on the heteroaryl or aryl group or in $R^1$, $R^2$ and $R^3$ mentioned below are hydroxy, alkoxy (especially $C_{1-20}$-alkoxy, more especially $C_{1-4}$-alkoxy); alkyl (especially $C_{1-4}$-alkyl, more especially $C_{1-20}$-alkyl); aryl (especially phenyl); —$NO_2$; —CN; ester, optionally substituted amino-, amido; halo (especially Cl, Br, F or I); $CF_3$; —CHO; —SCN; —$SO_2F$ and —$SO_2Cl$.

Preferred ester groups are of the formula —$OCOR^1$, —$CO_2R^1$, —$SO_3R^1$ or —$OSO_2R^1$, wherein $R^1$ is optionally substituted alkyl or optionally substituted aryl, preferably $C_{1-4}$-alkyl.

Preferred optionally substituted amino groups are of the formula:

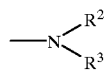

wherein $R^2$ and $R^3$ are each independently H, optionally substituted alkyl or optionally substituted aryl, or $R^2$ and $R^3$ together with the nitrogen atom to which they are attached form an optionally substituted ring.

Preferably $R^2$ is H or optionally substituted alkyl, more preferably H or optionally substituted $C_{1-20}$-alkyl, especially $C_{1-4}$-alkyl.

Preferably $R^3$ is optionally substituted alkyl or optionally substituted aryl, more preferably, optionally substituted $C_{1-20}$-alkyl or optionally substituted $C_{6-10}$ aryl.

When $R^2$ or $R^3$ is optionally substituted alkyl it is preferably straight chain, branched chain, or $R^2$ and $R^3$ together with the nitrogen atom to which they are attached form a 5- or 6-membered ring.

In a preferred embodiment $R^2$ is H or $C_{1-4}$-alkyl and $R^3$ is $C_{1-6}$-alkyl optionally substituted by one or two groups selected from hydroxy and —$OCOR^1$ wherein $R^1$ is as hereinbefore defined, preferably $C_{1-4}$-alkyl.

As is well known in organic chemistry molecules can exist in different tautomeric forms and these tautomers constitute the same molecule. For example azo groups often tautomerise between the azo and hydrazo form as shown below:

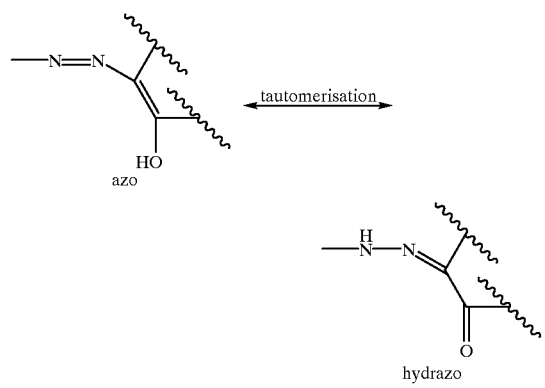

Dyes shown in the azo form in this specification therefore include all tautomers thereof, including where one or more of the hydroxy groups on the benzene ring exists in the keto form due to tautomerisation of the azo group to give a hydrazo group.

In view of the foregoing preferences the dye is preferably of Formula (1) or a tautomer thereof:

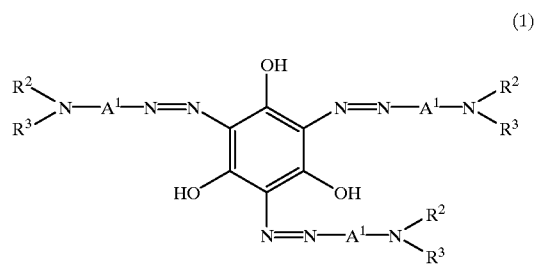

(1)

wherein each $A^1$ independently is optionally substituted phenylene and each $R^2$ and $R^3$ independently is as hereinbefore defined.

$A^1$ is preferably optionally substituted 1,4-phenylene. Preferred optional substituents are as described above in relation to $R^1$, $R^2$ and $R^3$.

Preferably the ink contains more than one, more preferably from two to ten, especially two to six of said dyes because this leads to improved ink stability and optical density.

A preferred dye which may be used in inks of the invention is of the Formula (2) or a tautomer thereof:

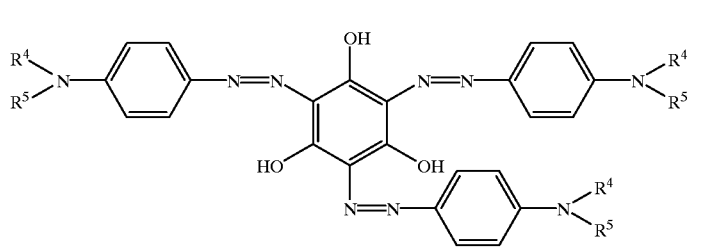

(2)

wherein:
each $R^4$ independently is $C_{1-4}$-alkyl;
each $R^5$ independently is $C_{1-6}$-alkyl optionally substituted by one or two groups selected from hydroxy and —$OCOR^1$ wherein each $R^1$ independently is $C_{1-4}$-alkyl; and
$R^4$ and $R^5$ are different to each other in at least one of the —$NR^4R^5$ groups. To express this in another way, at least one of the —$NR^4R^5$ groups shown in Formula (2) is different from at least one of the other —$NR^4R^5$ groups shown in Formula (2).

Dyes of Formula (2) and tautomers thereof form a further feature of the invention.

Compositions comprising two or more dyes of Formula (1) or (2) or tautomers thereof (preferably from 2 to 10, more preferably from 2 to 6 of said dyes), form a still further feature of the invention. Preferred compositions contain at least one dye of Formula (2) wherein $R^5$ is $C_{1-6}$-alkyl substituted by one or two hydroxy groups and at least one dye of Formula (2) wherein $R^1$ is $C_{1-6}$-alkyl substituted by one or two —$OCOR^1$ groups wherein each $R^1$ independently is as hereinbefore defined.

The dye is preferably insoluble in water and soluble in the water-dissipatable polymer. Therefore the dye is preferably free from carboxy and sulpho groups, for example it is preferably a disperse or solvent-soluble dye. Disperse and solvent soluble dyes are distinct from pigments in that pigments are insoluble in organic solvents and polyesters whereas disperse and solvent soluble dyes are soluble in organic solvents and polymers.

The dyes used in the inks may be prepared by diazotising an amine (e.g. of formula A—$NH_2$ wherein A is as hereinbefore defined), preferably below 5° C., in dilute mineral acid using $NaNO_2$, and coupling to 1,3,5-trihydroxybenzene. Generally from 3 to 5 molar equivalents of the amine are used relative to the amount of 1,3,5-trihydroxybenzene. If desired the resultant dye may be further reacted, for example by condensation with an acyl-halide or an anhydride to convert some or all of any hydroxy groups to ester groups.

If desired further dyes may be added to the ink, although this is not normally necessary because of the strong, attractive black colour of the dyes described above.

The water-dissipatable polymer preferably bears ionised carboxy and/or sulphonate groups, especially ionised sulphonate groups, because these assist water dissipatability of the polymer. Such groups can be chain pendant and/or terminal.

The water-dissipatable polymer is preferably a water-dissipatable polyester. The water-dissipatable polyester can be prepared using conventional polymerisation procedures known to be effective for polyester synthesis. Thus, it is well known that polyesters contain carbonyloxy (i.e. —C(=O)—O—) linking groups and may be prepared by a condensation polymerisation process in which an acid component (including ester-forming derivatives thereof) is reacted with a hydroxyl component. The acid component may be selected from one or more polybasic carboxylic acids, e.g. di- and tri-carboxylic acids or ester-forming derivatives thereof, for example acid halides, anhydrides or esters. The hydroxyl component may be one or more polyhydric alcohols or phenols (polyols), for example, diols, triols, etc. (It is to be understood, however, that the polyester may contain, if desired, a proportion of carbonylamino linking groups —C(=O)—NH— (i.e. amide linking groups) by including an appropriate amino functional reactant as part of the "hydroxyl component"; such as amide linkages). The reaction to form a polyester may be conducted in one or more stages. It is also possible to introduce in-chain unsaturation into the polyester by, for example, employing as part of the acid component an olefinically unsaturated dicarboxylic acid or anhydride.

Polyesters bearing ionised sulphonate groups may be prepared by using at least one monomer having two or more functional groups which will readily undergo an ester condensation reaction (e.g. carboxyl groups, hydroxyl groups or esterifiable derivatives thereof) and one or more sulphonic acid groups (for subsequent neutralisation after polyester formation) or ionised sulphonate groups (i.e. neutralisation of the sulphonic acid groups already having been effected in the monomer) in the synthesis of the polyester. In some cases it is not necessary to neutralise sulphonic acid groups since they may be sufficiently strong acid groups as to be considerably ionised in water even without the addition of base. Often, the sulphonic acid or ionised sulphonate containing monomer is a dicarboxylic acid monomer having at least one ionised sulphonate substituent (thereby avoiding any need to effect neutralisation subsequent to polyester formation). (Alternatively, alkyl carboxylic acid ester groups may be used in place of the carboxylic acid groups as ester-forming groups). Such a monomer will therefore be part of the acid component used in the polyester synthesis.

Preferred polybasic carboxylic acids which can be used to form the polyester have two or three carboxylic acid groups. For example, one can use $C_4$ to $C_{20}$ aliphatic, alicyclic and aromatic compounds having two or more carboxy groups and their ester forming derivatives (e.g. esters, anhydrides and acid chlorides), and dimer acids such as C36 dimer acids. Specific examples include adipic acid, fumaric acid, maleic acid, succinic acid, itaconic acid, sebacic acid, nonanedioic acid, decanedioic acid, 1,4-cyclohexanedicarboxylic acid, 1,3-cyclohexanedicarboxylic acid, 1,2-cyclohexanedicarboxylic acid, terephthalic acid, isophthalic acid, phthalic acid and tetrahydrophthalic acid and their acid chlorides. Anhydrides include succinic, maleic, phthalic and hexahydrophthalic anhydrides.

Preferred polyols which can be used to form the polyester include those having from 2 to 6, more preferably 2 to 4 and especially 2 hydroxyl groups per molecule. Suitable polyols having two hydroxy groups per molecule include diols such as 1,2-ethanediol, 1,3-propanediol, 1,4-butanediol, 1,6-hexanediol, 2,2-dimethyl-1,3- propanediol (neopentyl glycol), the 1,2-, 1,3- and 1,4-cyclohexanediols and the corresponding cyclohexane dimethanols, diethylene glycol, dipropylene glycol, and diols such as alkoxylated bisphenol A products, e.g. ethoxylated or propoxylated bisphenol A. Suitable polyols having three hydroxy groups per molecule include triols such as trimethylolpropane (1,1,1-tris (hydroxymethyl)ethane). Suitable polyols having four or more hydroxy groups per molecule include pentaerythritol (2,2-bis(hydroxymethyl)-1,3-propanediol) and sorbitol (1,2,3,4,5,6-hexahydroxyhexane).

Compounds having two or more groups which readily undergo an ester condensation reaction and have one or more sulphonate groups are dicarboxylic acid monomers having at least one ionised sulphonate group. Examples of such compounds are aromatic dicarboxylic acids having an ionised sulphonate group, for example those of the formula:

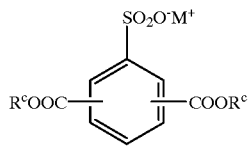

wherein M is a cation (preferably sodium, lithium or potassium)-, and each $R^c$ independently is H, a cation or $C_{1-4}$-alkyl (preferably methyl or ethyl). Preferred compounds of the above formula are of formula:

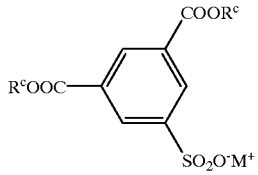

wherein M and Rc are as defined above. Particularly preferred is the mono sodium salt (one $R^C$ is H, the other is Na), this material being known as sodio-5-sulphoisophthalic acid (SSIPA).

Other useful compounds which have two or more groups which readily undergo an ester condensation reaction and have one or more sulphonate groups are dihydroxy monomers having at least one sulphonate group, especially those of the formula:

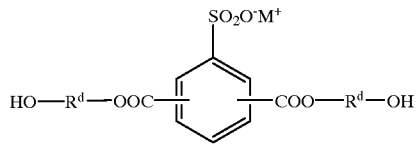

wherein M is as hereinbefore defined above and each $R^d$ independently is alkylene, preferably $C_{2-4}$-alkylene. Preferred compounds of the above formula are:

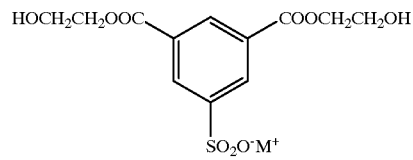

wherein M is as hereinbefore defined.

Polyesters bearing ionised carboxy groups can be prepared by various means. For example, if the hydroxyl component of the reactants is stoichiometrically in excess of the acid component, a hydroxyl-terminated polyester can be formed, which may be subsequently converted to a carboxy terminated polyester by wholly or partially reacting the hydroxyl groups with an appropriate reagent (e.g. an acid anhydride or a dicarboxylic acid). Alternatively, terminal carboxy functionality may be directly introduced by employing an appropriate stoichiometric excess of the acid component reactants. In another alternative, chain-pendant carboxy groups may be introduced by using reagents such as dimethylol propionic acid (DMPA) since if appropriate reaction condition are employed (e.g. polymerisation temperature below 150° C.) the hindered carboxy group thereof does not take part to any significant extent in the ester-forming reactions during the polyester synthesis and the DMPA effectively behaves as a simple diol. Chain-pendant and/or terminal carboxy groups could also be introduced by employing a tri- or higher functionality carboxylic acid or anhydride in the polyester synthesis, for example, trimellitic acid or anhydride. Combinations of the above procedures could also be used. It is thus seen that terminal or side-chain carboxy groups or both can be introduced as desired. These can be fully or partially neutralised with an appropriate base to yield ionised carboxy groups. The counter ions used may be as for the ionised sulphonate groups described above (apart from $H^+$ since the carboxylic acid groups themselves are normally insufficiently ionised to provide a significant amount of ionised carboxy groups—although F substituents would increase acid strength), with alkali metal ions such as $Na^+$, $Li^+$ and $K^+$ again being particularly preferred, and ammonium and organic amine derived cations less preferred because some have an undesirable odour.

The water-dissipatable polyester may optionally have hydrophilic non-ionic segments, for example within the polyester backbone (i.e. in-chain incorporation) or as chain-pendant or terminal groups. Such groups may act to contribute to the dispersion stability or even water-solubility of the polyester. For example, polyethylene oxide chains may be introduced into the polyester during its synthesis by using as part of the hydroxyl component, ethylene oxide-containing mono, di or higher functional hydroxy compounds, especially polyethlene glycols and alkyl ethers of polyethylene glycols, examples of which include:

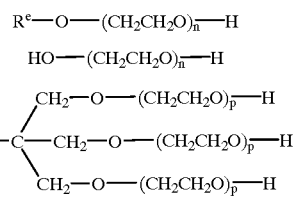

wherein $R^e$ is $C_{1-20}$-alkyl, preferably $C_{1-4}$-alkyl, more preferably methyl; n is 1 to 500; and p is 1 to 100.

A small segment of a polyethylene oxide chain could be replaced by a propylene oxide or butylene oxide chain in such non-ionic groups, but should still contain ethylene oxide as a major part of the chain.

The amount of ionised sulphonate and/or carboxy groups present in the polyester should be sufficient to provide or contribute to water-dissipatability of the polyester, although it should not be so high as to render the resulting polyester unacceptably water-sensitive. This amount will depend, inter alia, on factors such as the hydrophilicity/hydrophobicity of units provided by other monomers in the polyester synthesis or any surfactants (if used), and also the relative proportions of ionised sulphonate/carboxy groups. With regard to the last mentioned point, ionised sulphonate groups are more effective at providing or contributing to water-dissipatability than ionised carboxy groups and so can be used at considerably lower levels in comparison to ionised carboxy groups.

If the polyester is wholly or predominantly sulphonate stabilised (by which is meant the water dissipatability-providing groups are provided wholly or predominately by ionised sulphonate groups). The ionised sulphonate group content is preferably within the range from 7.5 to 100 milliequivalents (more preferably 10 to 75 milliequivalents and particularly 11 to 56 milliequivalents) per 100 g of polyester. When using SSIPA as the monomer for providing the ionised sulphonate groups, the amount of this monomer used in the polyester synthesis, based on the weight of all the monomers used in the polyester synthesis, will usually be within the range from 2 to 20% by weight (more usually 3 to 15% by weight). The carboxylic acid value (AV) of the polyester which is predominantly sulphonate stabilised, i.e. an AV based on the carboxylic acid groups only (i.e. excluding sulphonate groups) will generally be within the range of from 0 to 100 mgKOH/g, more preferably 0 to 50 mgKOH/g, especially 0 to 25 mgKOH/g, more especially 0 to 10 mgKOH/g.

If the polyester is predominantly stabilised by ionised carboxy groups, the carboxylic acid value AV of the polyester is preferably within the range of from 20 to 140 mgKOH/g (more preferably 30 to 100 mgKOH/g).

Usually, the polyester is either predominantly sulphonate-stabilised or predominantly carboxylate stabilised (preferably the former).

If the polyester contains polyethylene oxide chains, the polyethylene oxide chain content should preferably not exceed 25% by weight (and more preferably should not exceed 15% by weight), based on the total weight of the polyester, in order to avoid unacceptable water-sensitivity. Therefore the amount is preferably 0 to 25% by weight (more preferably 0 to 15% by weight) based on the total weight of polyester.

The water-dissipatable polyester preferably has a number average molecular weight Mn of up to 30,000. The Mn is preferably in the range from 500 to 30,000, more preferably 1000 to 25,000. These Mn lead to particularly good storage stability for the resultant inks. The measurement of Mn is well known to those skilled in the art, and may for example be effected using gel permeation chromatography in conjunction with a standard polymer such as polystyrene or polymethylmethacrylate of known molecular weight.

The water-dissipatable polyester preferably has a hydroxyl number of from 0 to 225 mg KOH/g, more preferably 0 to 125 mg KOH/g, especially from 0 to 50 mgKOH/g.

The ink preferably has a pH of 5 to 9, more preferably 5.5 to 8, especially 6 to 7.5. These preferences are based on increased ink stability.

The Tg of the water-dissipatable polyester (i.e. the temperature at which the polymer changes from a glassy, brittle state to a plastic, rubbery state) is preferably in the range −38° C. to 105° C., more preferably −20 to 70° C., especially −10° C. to 60° C.

The esterification polymerisation processes for making the polyesters for use in invention composition are known and need not be described here in more detail. Suffice to say that they are normally carried out in the melt using catalysts, for example a tin-based catalyst, and with the provision for removing any water or alcohol formed from the condensation reaction.

The water-dissipatable polyester may be dissipated in water by adding the solidified melt directly into water. The solidified melt is preferably in a form such as flake (which can often be obtained directly from the melt) or comminuted solid (obtained for example by grinding). Alternatively, water can be added directly to the hot polyester melt until the desired solids content/viscosity is reached. Still further, the polyester may be dissipated in water by adding an aqueous pre-dissipation (or organic solvent solution) of the polyester to the water phase.

The water-dissipatable polyesters normally do not need an external surfactant when being dissipated into water, although such surfactants may be used to assist the dissipation if desired and in some cases can be useful in this respect because additional surfactants reduce the required amount of dissipating groups (i.e. sulphonate, and (mono alkoxy) polyalkylene chains if used).

The water-dissipatable polymer may also be formed by performing free radical polymerisation of olefinically unsaturated monomers in the presence of a polyester. This gives what could be called a polyester-acrylic hybrid. Olefinically unsaturated monomers which can be used include olefinically unsaturated carboxy functional monomers, e.g. acrylic acid, methacrylic acid, fumaric acid, itaconic acid and β-carboxyethyl acrylate; olefinically unsaturated monomers which are free from carboxy and hydroxy groups, e.g. 1,3-butadiene, isoprene, styrene, vinylidene halides, vinylidene esters and esters of acrylic acid and methacrylic acid, e.g. methyl (meth)acrylate, ethyl (meth)acrylate n-butyl (meth)acrylate and 2-ethyl hexyl (meth)acrylate; and olefinically unsaturated monomers having a hydroxy group e.g. N-methylol (meth)acrylamide and hydroxy $C_{2-8}$-alkyl esters of (meth)acrylic acid. If the polyester has been prepared using a component which has unsaturation therein, e.g. fumaric acid, maleic acid or muconic acid or allyl-containing dihydroxy or dicarboxy compounds, the product from the polyesterification reaction will have unsaturation incorporated into its structure which can take part in the free radical polymerisation to give a graft copolymer. The free radical polymerisation processes use a free-radical generating initiator system such as (for example) the redox radical initiator system tertiary butylhydroxide/isoascorbic acid and will take place in the aqueous phase, rather than in the melt. However, excessive amounts of acrylic polymer (whether formed in the presence of polyester which has unsaturation or is free from unsaturation) often leads to a deterioration in ink properties and it is preferred that no acrylic polymer is present or, if its is present, the amount is less than 40%, preferably less than 30%, more preferably less than 10% by weight relative to the weight of polyester.

The dyed water-dissipatable polymer may be prepared by heating a water-dissipatable polymer and dye(s) at an elevated temperature, for example at a temperature in the range 35 to 150° C., preferably from 40 to 90° C. Simply mixing the dye and polymer in water at room temperature leads to a slight up-take of colour but heating is usually necessary for a full dyeing.

Preferably inks according to the invention are prepared by mixing together (i) a solution of a dye(s) in a water-immiscible solvent and (ii) a mixture of a water-dissipatable polymer, water-miscible solvent and optionally water. Equally the inks may be prepared by mixing together (i) a solution of a dye(s) in a mixture of a water-miscible solvent and a water-immiscible solvent and (ii) a water-dissipatable polymer and optionally water. In either case, if there is no water in component (ii) the water may be added to the mixture of (i) a (ii) subsequently to give an ink according to the invention. However it is preferred for component (ii) to contain water. These processes lead to particularly good up-take of dye(s) by the polymer to give intensely coloured inks.

The amount of dye and water-dissipatable polymer contained in the ink will vary according to the depth of shade required. Typically, however, the ink will comprise (a) from 0.5 to 15 parts, more preferably 0.8 to 10 parts, especially 1 to 5 parts in total of the dye(s);

(b) from 0.2 to 25 parts, more preferably 2 to 15 parts of a water-dissipatable polymer;

(c) from 40 to 90 parts, more preferably from 50 to 80 parts of water; and (d) from 0 to 60 parts, more preferably 0 to 40 parts of organic solvent;

wherein all parts are by weight and the total number of parts of (a)+(b)+(c)+(d) add up to 100.

The number of parts of the water-dissipatable polymer is calculated on a 100% solids basis. For example 50 g of a 20% solids polymer is taken as 10 g of polymer.

The ink may also contain an organic solvent (as mentioned in (d) above) and this may be a mixture of organic solvents. In a preferred embodiment the ink contains an organic solvent consisting of a water-miscible organic solvent and a water-immiscible organic solvent.

Suitable water-immiscible organic solvents include aromatic hydrocarbons, e.g. toluene, xylene, naphthalene, tetrahydronaphthalene and methyl naphthalene; chlorinated aromatic hydrocarbons, e.g. chlorobenzene, fluorobenzene, chloronaphthalene and bromonaphthalene; esters, e.g. butyl acetate, ethyl acetate, methyl benzoate, ethyl benzoate, benzyl benzoate, butyl benzoate, phenylethyl acetate, butyl lactate, benzyl lactate, diethyleneglycol dipropionate, dimethyl phthalate, diethyl phthalate, dibutyl phthalate, di(2-ethylhexyl)phthalate; alcohols having six or more carbon atoms, e.g. hexanol, octanol, benzyl alcohol, phenyl ethanol, phenoxy ethanol, phenoxy propanol and phenoxy butanol; ethers having at least 5 carbon atoms, preferably $C_{5-14}$ ethers, e.g. anisole and phenetole; nitrocellulose, cellulose ether, cellulose acetate; low odour petroleum distillates; turpentine; white spirits; naphtha; isopropylbiphenyl; terpene; vegetable oil; mineral oil; essential oil; and natural oil; and mixtures of any two or more thereof. Benzyl alcohol is especially preferred.

Suitable water-miscible organic solvents include $C_{1-5}$-alkanols, e.g. methanol, ethanol, n-propanol, isopropanol, n-butanol, sec-butanol, tert-butanol and isobutanol; amides, e.g. dimethylformamide and dimethylacetamide; ketones and ketone alcohols, e.g. acetone and diacetone alcohol; $C_{2-4}$-ether, e.g. tetrahydrofuran and dioxane; alkylene glycols or thioglycols containing a $C_2$–$C_6$ alkylene group, e.g. ethylene glycol, propylene glycol, butylene glycol, pentylene glycol and hexylene glycol; poly(alkylene-glycol)s and thioglycol)s, e.g. diethylene glycol, thiodiglycol, polyethylene glycol and polypropylene glycol; polyols, e.g. glycerol and 1,2,6-hexanetriol; and lower alkyl glycol and polyglycol ethers, e.g. 2-methoxyethanol, 2-(2-methoxyethoxy)ethanol, 2-(2-ethoxyethoxy)ethanol, 2-(2-butoxyethoxy)ethanol, 3-butoxypropan-1-ol, 2-[2-(2-methoxyethoxy)-ethoxy]ethanol, 2-[2-(2-ethoxyethoxy)ethoxy]-ethanol; cyclic esters and cyclic amides, e.g. optionally substituted pyrollidones; sulpholane; and mixtures containing two or more of the aforementioned water-miscible organic solvents. Preferred water-miscible organic solvents are $C_{1-6}$-alkyl mono ethers of $C_{2-6}$-alkylene glycols and $C_{1-6}$-alkyl mono ethers of poly($C_{2-6}$-alkylene glycols).

Component (d) of the above mentioned inks preferably comprises;

(i) 5 to 50% of a water-immiscible alcohol having at least six carbon atoms, (especially benzyl alcohol); and (ii) 50 to 95% of a water-miscible solvent comprising;

(a) a cyclic ester or cyclic amide (especially an optionally substituted pyrrolidone);

(b) a water-miscible $C_{1-6}$-alkyl mono ether of a $C_{2-6}$-alkylene glycol or $C_{1-6}$-alkyl mono ether of poly($C_{2-6}$-alkylene glycol); or (c) a mixture of (a) and (b).

wherein all % are by weight and add up to 100%.

The water-immiscible solvent preferably has a solubility in water at 20° C. of up to 50 g/l. The water-miscible solvent preferably has a solubility in water at 20° C. of more than 50 g/l.

The preferred optionally substituted pyrrolidones, are 2-pyrrolidone, dimethyl pyrrolidone, N-methyl-2-pyrrolidone, N-ethyl-2-pyrrolidone and N-(2-hydroxyethyl)-2-pyrrolidone and mixtures thereof.

The ratio of water-miscible organic solvent to water-immiscible organic solvent is preferably 19:1 to 1:1, more preferably 8:1 to 1:1, especially 5:1 to 1:1.

Use of dyes has advantages over the use of pigments in that less dye is usually required than would be the case for a pigment, expensive milling is avoided, the inks are less likely to form a precipitate on standing, a far greater variety of shades are available and the resultant prints have good transparency. The inks of the present invention also benefit from good light- and water-fastness.

Preferably the inks have been filtered to remove particulate matter using a filter having a mean pore size below 10 µm, more preferably below 5 µm and especially below 2 µm. This filtration lowers the likelihood of the printer nozzles becoming blocked.

A valuable feature of the invention is the low tendency for blocking the nozzles of thermal ink jet printers. Many other water dispersible polymer inks work poorly or even not at all in thermal printers. Inks of the invention form discrete droplets on the substrate with little tendency for diffusing. Consequently sharp images can be obtained, resulting in excellent print quality and little if any bleed between colours printed side-by side.

A further feature of the invention provides a composition comprising a water-dissipatable polymer and a dye as hereinbefore defined, preferably of Formula (1) or (2). In these compositions the preferred water-dissipatable polymers and dyes are as hereinbefore described. Such compositions may be dissipated in water and optionally mixed with further ingredients to give in ink, for example with one or more organic solvents.

The composition preferably comprises (a) 0.125 to 40 parts of a dye as hereinbefore defined (preferably of Formula (1) or (2)); and (b) 99.875 to 60 parts of a water-dissipatable polymer, wherein the total number of parts of (a) and (b) adds up to 100.

According to a further feature the present invention provides a process for printing an image on a substrate comprising applying thereto an ink comprising water, a water-dissipatable polymer and a dye as hereinbefore defined (preferably of Formula (1) or (2)) by means of an ink jet printer.

The ink jet printer emits droplets of the ink onto a substrate from a nozzle without bringing the nozzle into contact with the substrate. Preferably the ink jet printer is a thermal or piezoelectric ink jet printer.

The substrate is preferably a paper, an overhead projector slide or a textile material. Preferred textile materials are cotton, polyester and blends thereof.

When the substrate is a textile material the process for printing an image thereon according to the invention preferably further comprises the step of heating the resultant printed textile, preferably to a temperature of 50° C. to 250° C.

A further feature of the present invention is a cartridge suitable for use in an ink jet printer containing an ink according to the invention. Also there is provided an ink jet printer containing an ink according to the invention.

The invention is further illustrated by the following examples in which all parts and percentages are by weight unless specified otherwise. In these Examples the following abbreviations are used:

Paper XA is Xerox 4024 from Rank Xerox.

Paper GB is Gilbert Bond paper from the Mead Corporation.

Paper WC is Wiggins Conqueror High White Wove 100 g/m² from Arjo Wiggins Ltd.

means not measured.

Water-Dissipatable Polymer ("Resin 1")

To a glass reactor fitted with distillation column and condenser were charged ingredients A, B, D, F, G and 50% of C and 50% of H. The contents were heated with stirring to a reaction temperature of 210° C. until the mixture was clear and the acid value was <10 mgKOH/g. At this point E and the remainder of C and H were charged and the temperature raised to 230° C. The reaction was continued under reduced pressure until an acid value of 5.3 mgKOH/g was obtained. The resin was further characterised by a hydroxyl value=27.6 mgKOHg, ICI Cone and Plate viscosity @ 125° C.=80 poises and a Tg (onset)=25.40° C. and a number average molecular weight by end group analysis of approximately 2000. The resin was readily dispersed in warm distilled water to give a clear solution having a solids content of 20% w/w (hereinafter "Resin 1").

| Monomer | Abbreviation | Weight (g) |
| --- | --- | --- |
| neopentyl glycol | A | 206.25 |
| diethylene glycol | B | 82.5 |
| isophthalic acid | C | 300 |
| sodio-5-sulpho-isophthalic acid | D | 75 |
| adipic acid | E | 37.5 |
| methoxy PEG 750 | F | 75 |
| sodium acetate | G | 1.5 |
| Fascat 4101 | H | 0.75 |

Water-dissipatable Polymer ("Resin 2")

To a glass reactor fitted with distillation column and condenser were charged ingredients A, B, C, E, G, H and 50% of D and 50% of I. The contents were heated with stirring to a reaction temperature of 210° C. until the mixture was clear and the acid value was 1.25 mgKOH/g. At this point F and the remainder of D and I were charged and the temperature raised to 230° C. The reaction was continued under reduced pressure until an acid value of 2.8 mgKOH/g was obtained. The resin was further characterised by a hydroxyl value=19.7 mgKOH/g, ICI Cone and Plate viscosity @ 125° C.=90 poises and a Tg (onset)=4° C. The resin was readily dispersed in warm distilled water to give a clear solution having a solids content of 20% w/w. (hereinafter "Resin 2").

| Monomer | Abbreviation | Weight (g) |
| --- | --- | --- |
| neopentyl glycol | A | 653.47 |
| diethylene glycol | B | 479.21 |
| 1,6 hexane diol | C | 396.04 |
| isophthalic acid | D | 1584.16 |
| sodio-5-sulpho-isophthalic acid | E | 396.04 |
| adipicacid | F | 198.02 |
| methoxy PEG 750 | G | 396.04 |
| sodium acetate | H | 8 |
| Fascat 4101 | I | 4 |

Water-Dissipatable Polymer ("Resin 3")

To a glass reactor fitted with distillation column and condenser were charged ingredients A, B, D, E, F, G and 50% of C and 50% of H. The contents were heated with stirring to a reaction temperature of 210° C. until the mixture was clear and the acid value was <10 mgKOH/g. At this point the remainder of C and H were charged and the temperature raised to 230° C. The reaction was continued under reduced pressure until an acid value of 9.4 mgKOH/g was obtained. The resin was further characterised by a hydroxyl value=12.8 mgKOHg, ICI Cone and Plate Viscosity @ 125° C.=>500 poises and a Tg (onset)=18° C. The number average molecular weight as determined by gel permeation chromatography (PS Equivalents) was 1800. The resin was readily dispersed in warm distilled water to give a clear solution having a solids content of 20% w/w (hereinafter "Resin 3").

| Monomer | Abbreviation | Weight (g) |
| --- | --- | --- |
| neopentyl glycol | A | 15 |
| diethylene glycol | B | 10 |
| isophthalic acid | C | 45 |
| sodio-5-sulpho-isophthalic acid | D | 10 |
| Hexane-1,6-diol | E | 10 |
| Methoxy PEG 750 | F | 10 |
| Sodium acetate | G | 0.2 |
| Fascat 4101 | H | 0.1 |

EXAMPLE 1

Preparation of a Dye of the Following Formula Wherein $R^1$=H

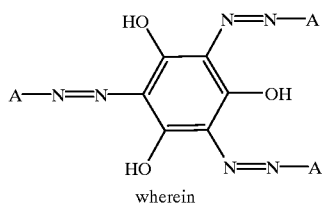

wherein

-continued

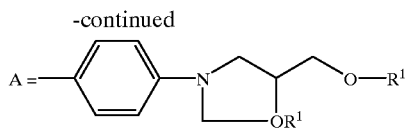

Stage A—Preparation of

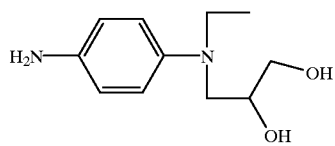
(A)

A suspension of N-ethylaniline (50.3 ml), 2,3-dihydroxychloropropane (36.8 ml) and calcium carbonate (44.0 g) in water (80 ml) was heated under reflux for 100 hours. The mixture was filtered whilst hot, and the residue washed with methylated spirits (300 ml). The combined filtrates were evaporated to dryness, dissolved in methylated spirits, refiltered and evaporated to dryness. The residue was dispersed in 50/50 hexane/ethyl acetate (750 ml) filtered-off and pulled dry to give a 63 g of cream solid.

A solution of sodium nitrite (11.85 g) in water (100 ml) was added dropwise to a solution of the cream solid (33.5 g) in concentrated hydrochloric acid (200 ml) at 0° C. The reaction was allowed to rise to room temperature with constant stirring and then maintained at room temperature for 1 hour. The mixture was diluted with methanol (500 ml) and the pH adjusted to ~8.0 using concentrated sodium hydroxide, keeping the temperature below 30° C., to give a nitrous solution.

A solution of sodium borohydride (15.5 g) in water (300 ml) was added to a stirred suspension of 5% palladium on carbon (2 g) in water (200 ml) under nitrogen at room temperature. The above nitrous solution was added slowly under nitrogen. The mixture was stirred for ½ hr and then filtered through kieselguhr, the filtrate was acidified to pH 4.0 with conc. hydrochloric acid and evaporated to dryness to give the intermediate compound of formula (A) as a brown oil.

Stage B

A solution of sodium nitrite (11.5 g) in water (100 ml) was added dropwise to a solution of the compound (A) resulting from Stage (A) (0.172 mol) in water (300 ml) and conc. Hydrochloric acid at 0–5° C. The mixture was stirred for 1 hour at 0–5° C., the excess nitrous acid was destroyed using sulphamic acid, and the solution was added dropwise to a solution of 1,3,5-trihydroxybenzene (6.18 g) in water (200 ml) at 0–5° C., and the pH kept at approx. 9.0 (2 m NaOH) for 1 hour.

A further portion of the compound (A) (0.074 mol) was diazotised as above and added dropwise to the mixture and the reaction was then stirred for a further 2 hours at 0–5° C. and pH 9.0. The resultant product was filtered-off, dispersed in water (1000 ml), filtered-off again, and then dried in vacuo. The crude product was dissolved in hot 50/50 tetrahydrofuran/methanol (1500 ml), filtered, and the filtrate evaporated to dryness to give the title dye wherein $R^1$=H as a black powder (28 g)

EXAMPLE 2

Preparation of a Mixture of Dyes of the Formula Shown Below Wherein $R^1$=H:—$COCH_3$ in a ratio approximately of 5:1

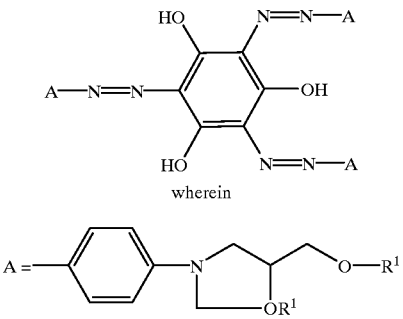

wherein

Acetic anhydride (0.125 ml, 0.00125 mol) was added to a solution of dye resulting from Example 1 ($R^1$=H), (5.93 g, 0.0075 mol)) in acetic acid (250 ml) at 80° C. The mixture was stirred for 1 hour at 100° C., cooled, added to ice (1000 g) and the pH adjusted to 5.0 using 2M sodium hydroxide, keeping the temperature below 10° C. The crude product was filtered-off, dispersed in water (300 ml), refiltered, washed with water (100 ml) and dried. The solid was stirred in warm 50/50 tetrahydrofuran/methanol (200 ml), filtered off, and the filtrate evaporated to dryness to give 4.44 g of the title dye.

EXAMPLE 3

Preparation of a Dye as Shown in Example 1 Wherein $R^1$=—$COCH_3$

Acetic anhydride (20 ml) was added to a solution of dye resulting from Example 1 (8.2 g, $R^1$=H) in acetic acid at 80° C. using the general method of Example 2. The resulting product was a black solid. (Yield=1.9 g).

EXAMPLE 4

Preparation of a Mixture of Dyes of the Formula Shown in Example 1 Wherein $R^1$=H:—$COCH_3$ in a Ratio of Approximately 4:2

The dye was prepared by reacting the dye from Example 1 (5.93 g; 0.0075 mol) with acetic anhydride (0.24 ml; 0.0025 mol) using the general methods of Example 2.

Yield=3.42 g

EXAMPLE 5

Preparation of Inks

Each dye or dye mixture was dissolved in benzyl alcohol and 2-pyrrolidone. The water-dissipatable polyester was dissipated in water and then mixed with the dye solution and shaken to give the homogeneous ink.

Table 1 below shows the final formulation of inks 1 to 4 used in Example 5. The first column identifies the component and the subsequent columns show the amount in parts by weight of each component in resultant inks.

TABLE 1

| Component | Ink 1 | Ink 2 | Ink 3 | Ink 4 |
|---|---|---|---|---|
| Dye from Example 1 | 3 | | | |
| Dye from Example 2 | | 3 | | |
| Dye from Example 3 | | | 1 | |
| Dye from Example 4 | | | | 3 |
| Benzyl Alcohol | 10 | 10 | 10 | 10 |
| 2-Pyrollidone | 20 | 20 | 20 | 20 |
| Resin 3# | 45 | 45 | 45 | 45 |
| Water | 22 | 22 | 24 | 22 |

20% w/v solution in water at pH 6.5.

EXAMPLE 6

Ink Jet Printing

The inks described in Example 5 were printed onto the papers listed in Table 2 below using a Olivetti JP 450 ink jet printer and tested as follows:

OD: The optical density of a print was measured using an X-Rite 938 Spectrodensitometer.

LF (ΔE): The light fastness was determined by the change in L.a.b coordinates as measured by an X-Rite 938 Spectrodensitometer after the print has been irradiated for 100 hrs in a Atlas Ci35A Weatherometer. A low figure indicates high light-fastness. WF: Wet fastness was determined by running water (0.5 ml) down lines of print at an angle of approximately 45° C. immediately after the lines had been printed. The prints were given a score of 1–10 where 1 indicates poor wet fastness and 10 indicates no detected ink run down.

TABLE 2

| Ink | OD (Paper) | LF (ΔE) | WF |
|---|---|---|---|
| 1 | 0.59 (XA) | | 10 |
| 2 | 1.07 (XA) | 22 | 9 |
| 3 | 0.73 (WC) | — | 10 |
| 4 | 1.12 (WC) | 28 (50 hrs) | 10 |

XA = Xerox 4024 paper from Rank Xerox.
WC = Conqueror high white wove 100 g/m² paper from Arjo Wiggins Appleton.

EXAMPLE 7

Further inks may be prepared having the formulations described in Tables 3 and 4 below wherein the following abbreviations are used. These inks may be applied to plain paper using an ink jet printer.

FRU: fructose
Resin*: Identifies which of Resins 1, 2 and 3 was used. Each Resin consisted of 20% solids and 80% water. The number of parts by weight of resins is shown in brackets.
BZ: Benzyl alcohol
DEG: Diethylene glycol
DMB: Diethyleneglycol monobutyl ether
ACE: Acetone
IPA: Isopropyl alcohol
MEOH: Methanol
2P: 2-Pyrollidone
MIBK: Methylisobutyl ketone
SUR: Surfynol 465 (a surfactant)
PHO: $K_2PO_4$
TEN: triethanolamine
NMP: N-methyl pyrollidone
TDG: Thiodiglycol
CAP: Caprolactam
BUT: Butylcellosolve

TABLE 4

| Dye | Dye Content | Water | Resin* (parts) | BZ | DEG | ACE | NaOH | $(NH_4)_2SO_4$ | IPA | MEOH | 2P | MIBK | BUT |
|---|---|---|---|---|---|---|---|---|---|---|---|---|---|
| 1 | 2.0 | 58 | 1(10) | | 6 | 4 | | | | | 10 | 10 | |
| 2 | 3.0 | 61.8 | 1(10) | 5 | 5 | | 0.2 | | | | 15 | | |
| 1 | 2.1 | 60.9 | 2(6) | 8 | | | | | | | 20 | 1 | 2 |
| 3 | 1.1 | 61.9 | 2(12) | | 9 | | 0.5 | 0.5 | | | 9 | 5 | 1 |
| 1 + 2 | 5 | 54 | 3(5) | 15 | 3 | 3 | | | 6 | | 5 | 4 | |
| 4 | 5 | 50 | 2(15) | 20 | | | | | 10 | | | | |
| 2 | 2.4 | 51.6 | 1(5) | 4 | | 5 | | | | 6 | 20 | 5 | 1 |
| 3 | 4.1 | 68.6 | 3(10) | 5 | 2 | 10 | | 0.3 | | | | | |
| 1 | 3.2 | 57.8 | 2(4) | 5 | 4 | 6 | | | 5 | 4 | 6 | 5 | |
| 1 | 5 | 70 | 3(10) | 6 | 2 | 2 | | | 1 | | 4 | | |
| 4 | 1.8 | 63.2 | 2(10) | 5 | | | | | | | 15 | 5 | |
| 1 | 3.3 | 63.7 | 2(12) | | | 10 | | | | 2 | | 6 | 3 |
| 2 | 2.0 | 62.7 | 3(5) | 10 | | 7 | 0.3 | | 3 | | 10 | | |
| 3 | 5.4 | 49.6 | 1(4) | 20 | 2 | 1 | | | | | 15 | 3 | |
| 1 | 1.0 | 63 | 1(7) | 5 | 4 | | | | | | 15 | 5 | |

TABLE 5

| Dye | Dye Content | Water | Resin* (parts) | BZ | NMP | SUR | TEN | TDG | FRU | PHO | DMB | $CH_3NH_2$ | CAP |
|---|---|---|---|---|---|---|---|---|---|---|---|---|---|
| 3 | 1.5 | 63 | 1(10) | 5 |   | 0.15 | 0.5 | 20 |   |   |   |   |   |
| 1 | 2.5 | 60 | 2(15) | 6 | 15 |   |   |   |   | 0.12 |   |   | 4 |
| 1 | 3.1 | 64 | 3(10) | 8 |   | 0.3 |   | 15 |   |   |   | 0.2 |   |
| 3 | 0.9 | 63 | 1(5) | 10 | 20 |   |   |   | 0.5 | 0.2 |   |   |   |
| 3 | 8.0 | 40 | 1(15) | 15 | 15 |   |   | 5 |   |   |   |   | 2 |
| 2 | 4.0 | 67 | 2(10) | 10 | 4 |   |   |   | 1 |   | 4 | 0.2 |   |
| 4 | 2.2 | 67 | 2(10) | 10 | 3 |   |   |   | 2 |   | 6 |   |   |
| 2 | 9.0 | 54 | 3(15) | 9 | 7 |   | 0.5 |   |   | 0.95 | 5 |   |   |
| 3 | 5.0 | 57 | 2(10) | 11 |   |   |   | 10 |   |   | 6 |   | 1 |
| 1 | 5.4 | 54 | 3(12) | 5 | 17 |   |   |   |   |   | 7 |   |   |
| 3 | 2.1 | 65 | 1(15) | 5 | 5 | 0.1 | 0.2 | 2 | 0.5 | 0.1 | 5 |   |   |
| 2 | 2 | 56 | 2(10) | 10 | 5 |   |   | 12 |   |   | 5 |   |   |
| 4 | 6 | 44 | 3(20) | 5 | 8 |   |   |   |   |   | 5 |   | 12 |
| 1 | 8 | 50 | 2(13) | 15 | 2 |   |   |   |   |   | 12 |   |   |

We claim:

1. An ink comprising water, a water-dissipatable polymer and one or more dyes comprising a benzene ring carrying a hydroxy group at each of the 1-, 3- and 5-positions and an azo group at each of the 2-, 4- and 6-positions or a tautomer thereof.

2. An ink according to claim 1 wherein each azo group independently is of the formula —N=N—A wherein A is an optionally substituted heteroaryl or optionally substituted aryl group.

3. An ink according to claim 1 wherein at least one of the dyes is of the Formula (1):

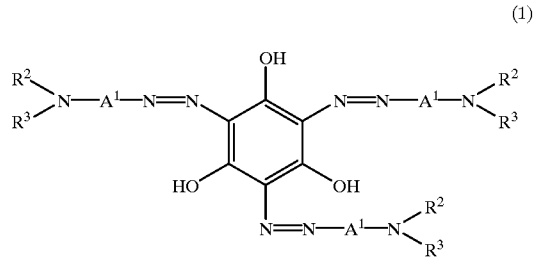

wherein each $A^1$ independently is optionally substituted phenylene and each $R^2$ and $R^3$ independently is H, optionally substituted alkyl or optionally substituted aryl, or $R^2$ and $R^3$ together with the nitrogen atom to which they are attached form an optionally substituted ring.

4. An ink according to claim 1 wherein the dye is of the Formula (2) or a tautomer thereof:

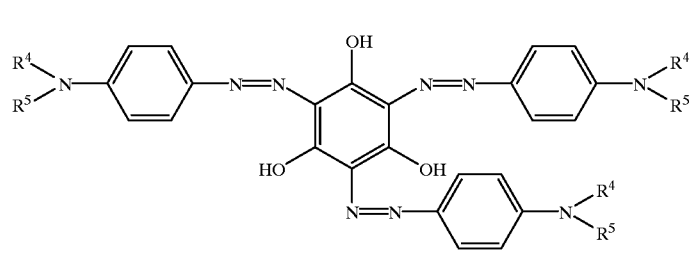

wherein:
each $R^4$ independently is $C_{1-4}$-alkyl;

each $R^5$ independently is $C_{1-6}$-alkyl optionally substituted by one or two groups selected from hydroxy and —$OCOR^1$ wherein each $R^1$ independently is $C_{1-4}$-alkyl; and $R^4$ and $R^5$ are different to each other in at least one of the —$NR^4R^5$ groups.

5. An ink according to claim 1 which comprises:
   (a) from 0.5 to 15 parts in total of dyes having a benzene ring carrying a hydroxy group at each of the 1-, 3- and 5-positions and an azo group at each of the 2-, 4- and 6-positions or a tautomer thereof;
   (b) from 0.2 to 25 parts of a water-dissipatable polymer;
   (c) from 40 to 90 parts of water; and
   (d) from 0 to 60 parts of organic solvent;
wherein all parts are by weight and the total number of parts (a)+(b)+(c)+(d) add up to 100.

6. An ink according to claim 1, 2, 3, 4, or 5, wherein the polymer is a water dissipatable polyester.

7. An ink according to claim 5 wherein the organic solvent consists of a mixture of a water-miscible organic solvent and a water-immiscible organic solvent.

8. A dye of Formula (2) and tautomers thereof:

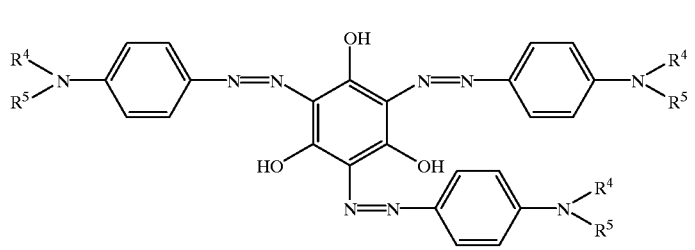

(2)

wherein:
  each $R^4$ independently is $C_{1-4}$-alkyl;
  each $R^5$ independently is $C_{1-6}$-alkyl optionally substituted by one or two groups selected from hydroxy and —OCOR$^1$ wherein each $R^1$ independently is $C_{1-4}$-alkyl;
wherein at least one of the —NR$^4$R$^5$ groups shown in Formula (2) is different from at least one of the other —NR$^4$R$^5$ shown in Formula (2).

9. A composition comprising two or more dyes of Formula (1):

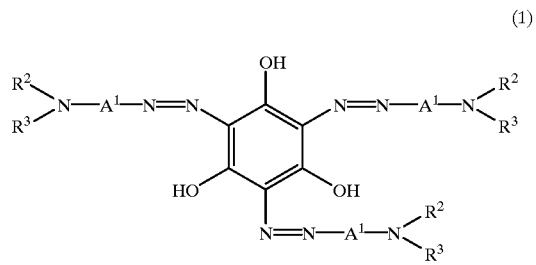

(1)

wherein each $A^1$ independently is optionally substituted phenylene and each $R^2$ and $R^3$ independently is H, optionally substituted alkyl or optionally substituted aryl, or $R^2$ and $R^3$ together with the nitrogen atom to which they are attached form an optionally substituted ring.

10. A composition comprising a water-dissipatable polymer and one or more dyes having a benzene ring carrying a hydroxy group at each of the 1-, 3- and 5-positions and an azo group at each of the 2-, 4- and 6-positions or a tautomer thereof.

11. A process for printing an image on a substrate comprising applying thereto an ink according to claim 1, 2, 3, 4 or 5 by means of an ink jet printer.

12. A cartridge suitable for use in an ink jet printer containing an ink according to claim 1, 2, 3, 4 or 5.

13. An ink jet printer containing an ink according to claim 1, 2, 3, 4 or 5.

* * * * *